US 6,731,858 B2

(12) United States Patent  
Sato

(10) Patent No.: US 6,731,858 B2
(45) Date of Patent: May 4, 2004

(54) DEVICE AND METHOD FOR ACQUIRING MODEL INFORMATION OF A MODULE

(75) Inventor: Naoyuki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 49 days.

(21) Appl. No.: 09/760,566

(22) Filed: Jan. 16, 2001

(65) Prior Publication Data

US 2001/0021943 A1 Sep. 13, 2001

(30) Foreign Application Priority Data

Jan. 17, 2000 (JP) ........................................ 2000-010373

(51) Int. Cl.[7] ................................................. H04N 5/91
(52) U.S. Cl. ............................ 386/46; 386/124; 710/1; 710/8
(58) Field of Search ............................. 386/124, 98, 95, 386/52, 55, 117; 710/104, 1, 8, 10, 15, 22

(56) References Cited

U.S. PATENT DOCUMENTS 5,809,331 A * 9/1998 Staats et al. .................. 710/104
5,999,989 A * 12/1999 Patel ................................ 710/1
6,038,625 A * 3/2000 Ogino et al. ................. 710/104
6,199,136 B1 * 3/2001 Shteyn ......................... 710/104
6,210,051 B1 * 4/2001 Sakurai ........................ 400/62
6,415,337 B1 * 7/2002 Chung ........................... 710/16

* cited by examiner

Primary Examiner—Vincent Boccio
Assistant Examiner—James A Fletcher
(74) Attorney, Agent, or Firm—Frommer Lawrence Haug LLP; William S. Frommer

(57) ABSTRACT

An electronic device has memory (configuration ROM) which is directly accessible from another electronic device. The memory has an area (for example, a "Model_ID" entry of a root directory) to store its own model information and another area (for example, a Model_ID entry of a module information directory) to store model information of a module to which the electronic device is connected. The information pointing to a storage location of the module information directory is set at a "Module_info" entry of the root directory. The model information includes model ID for identifying models and user interface information for describing models (textual data and icon data). When another electronic device accesses the memory, it aquires the above information. This allows it to easily aquire model information of the module to which the electronic device is connected.

19 Claims, 11 Drawing Sheets

FIG. 4

| bus_info_length | crc_length | bus_info_crc | | | | | |
|---|---|---|---|---|---|---|---|
| "1" | "3" | "9" | | | "4" | | |
| reserved | cyc_clk_acc | max_rec | reserved | max_ROM | generation | r | link_spd |
| pmc | | | | | | | |
| bmc | | | | | | | |
| isc | | | | | | | |
| cmc | | | | | | | |
| irmc | | | | | | | |
| node_vendor_id | | | | chip_id_hi | | | |
| chip_id_lo | | | | | | | |

FIG. 5 most significant → least significant

| type | key_ID | value |
|---|---|---|

FIG. 6

| type | Name | Usage of value |
|---|---|---|
| 0 | immediate | immediate value |
| 1 | CSR offset | Unsigned offset of an address within units space (relative to FFFF F000 0000$_{16}$) |
| 2 | Leaf | Unsigned offset of a leaf within configuration ROM (relative to the current directory entry) |
| 3 | Directory | Unsigned offset of a directory within configuration ROM (relative to the current directory entry) |

F I G. 7

| key_ID | Name | Permitted type values | Permitted directories |
|---|---|---|---|
| 1 | Descriptor | DL | any |
| 2 | Bus_Dependent_Info | IDL | root |
| 3 | Vendor | IDL | any |
| 4 | Hardware_Version | I | any |
| 5-6 | reserved for future standardization | | |
| 7 | Module | DL | root |
| 8-B$_{16}$ | reserved for future standardization | | |
| C$_{16}$ | Node_Capabilities | I | root |
| D$_{16}$ | EUI_64 | L | any |
| E$_{16}$-10$_{16}$ | reserved for future standardization | | |
| 11$_{16}$ | Unit | D | root or insance |
| 12$_{16}$ | Specifier_ID | I | any |
| 13$_{16}$ | Version | I | any |
| 14$_{16}$ | Dependent_info | ICDL | any |

FIG. 8

| key_ID | Name | Permitted type values | Permitted directories |
|---|---|---|---|
| $15_{16}$ | Unit_Location | L | unit |
| $16_{16}$ | reserved for future standardization | | |
| $17_{16}$ | Model | D | any |
| $18_{16}$ | Instance | — | root or instance |
| $19_{16}$ | Keyword | L | root or instance |
| $1A_{16}$ | Feature | D | instance or unit |
| $1B_{16}$ | Extended_ROM | L | root |
| $1C_{16}$ | Extended_Key_Specifier_ID | — | any |
| $1D_{16}$ | Extended_Key | — | any |
| $1E_{16}$ | Extended_Data | ICDL | any |
| $1F_{16}$ | Modifiable_Descriptor | L | any |
| $20_{16}$ | Directory_ID | — | any |
| $21_{16}$–$2F_{16}$ | reserved for future standardization | | |
| $30_{16}$–$37_{16}$ | allocated for definition by bus standard | | |
| $38_{16}$–$3F_{16}$ | allocated for definition by directory specifier | | |

DEVICE AND METHOD FOR ACQUIRING MODEL INFORMATION OF A MODULE

BACKGROUND OF THE INVENTION

The present invention relates generally to an electronic device which is preferably applied to an IEEE 1394 interface and to an electronic apparatus which incorporates such electronic device and to a method for acquiring model information of a module. It relates more particularly to an electronic device wherein memory means to which another electronic device can access directly, has a plurality of storage areas for storing electronic devices' model information, thereby allowing the other electronic device to easily acquire model information of a predetermined electronic device such as a module to be connected with the electronic device.

As an example of an electronic device, an IEEE 1394 interface unit included in a video cassette recorder (VCR) and connectable to an IEEE 1394 bus has been illustratively suggested. This IEEE 1394 interface unit includes a configuration ROM on which various kinds of information about the interface unit are stored. This configuration ROM is accessible directly from another electronic device so that the device can easily fetch the information from the configuration ROM.

The configuration ROM is provided with a storage area for storing model information. The model information stored on the storage area comprises a model identifier (ID) for identifying the model of the interface unit. If the model of the interface unit differs from that of the module, for example, the VCR, which is connected to this interface unit, only the model information of the interface unit can be acquired even when the configuration ROM is accessed from said another electronic device.

It is an object of the present invention to provide an electronic device or the like allowing such another electronic device to easily acquire the model information of the predetermined electronic devices such as a module to which the electric device is connected.

SUMMARY OF THE INVENTION

According to the present invention, the foregoing object is attained by an electronic device comprising memory which is directly accessible from another electronic device. The memory includes a plurality of storage areas for storing electronic devices' model information. For example, the memory includes first and second storage areas. The first storage area stores model information of the electronic device itself while the second storage area stores mod information of a predetermined electronic device such as a module which is connected with this electronic device.

Furthermore, an electronic apparatus according to the present invention comprises a first electronic device and a second electronic device which is connected with the first electronic device. In this electronic apparatus, the first electronic device incorporates memory which is directly accessible from another electronic device. This memory means includes at least a storage area for storing model information of the first electronic device and a storage area for storing model information of the second electronic device.

In addition, the present invention provides a method of acquiring model information of the module. In this method, when such another electronic device accesses a memory in an electronic device connected to the module, it may acquire model information of said module. This allows such another electronic device to acquire the model information of the module.

The electronic device according to the present invention has memory means, which is accessible directly from another electronic device, as described above. For example, this memory means includes at least the storage area for storing model information of the first electronic device and another storage area for storing model information of the predetermined electronic device such as a module (or the second electronic device). In this arrangement, when the memory means is accessed from any other electronic device, model information of the predetermined electronic device, for example, the module can be acquired relatively simply.

The model information to be acquired in this way includes a model identifier for identifying the electronic device's model and user interface information on the model (textual data and icon data).

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 4 is a schematic diagram showing the data structure of a bus information block;

FIG. 5 is a schematic diagram showing the format of a directory entry;

FIG. 6 is a table describing types of directory entries;

FIG. 7 is a table describing key IDs;

FIG. 8 is another table describing key IDs;

DESCRIPTION OF THE PREFERRED EMBODIMENT

Preferred embodiments according to the present invention are described in reference to the drawings.

Figure 1:
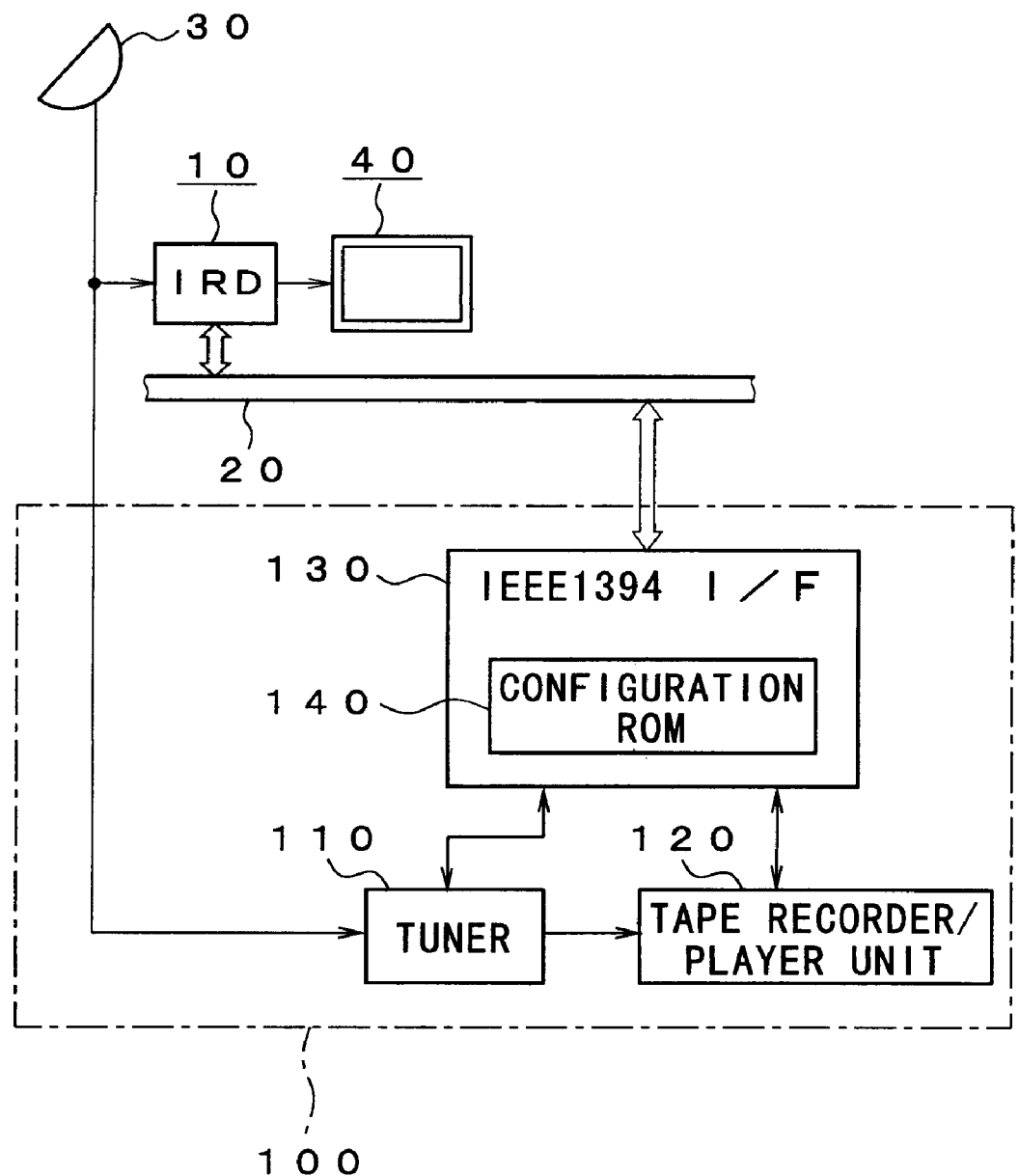
FIG. 1 is a block diagram showing a network system in which a plurality of nodes are interconnected through an IEEE 1394 bus.

FIG. 1 shows a network system in which a plurality of nodes are interconnected through an IEEE 1394 bus. This network system comprises an integrated receiver decoder (IRD) 10 as a receiver for receiving digital signals in satellite broadcasting and a video cassette recorder (VCR) 100, both of which are connected to the IEEE 1394 bus 20. In this network system, each of the IRD 10 and VCR 100 functions as an IEEE 1394 node. In addition, the system includes a receiving antenna 30 and a monitor 40, which are connected to the IRD 10.

For connection to the IEEE 1394 bus 20, the VCR 100 incorporates an IEEE 1394 interface unit 130. The VCR 100 includes also a tuner 110, to which the antenna 30 is connected, and a tape recorder/player unit 120, which is capable of processing video data in the format used, for example, for MPEG-2 transport stream and for digital VCR. Furthermore, the interface unit 130 has a configuration ROM 140 on which information about the IEEE 1394 interface unit 130 is stored.

Figure 2:
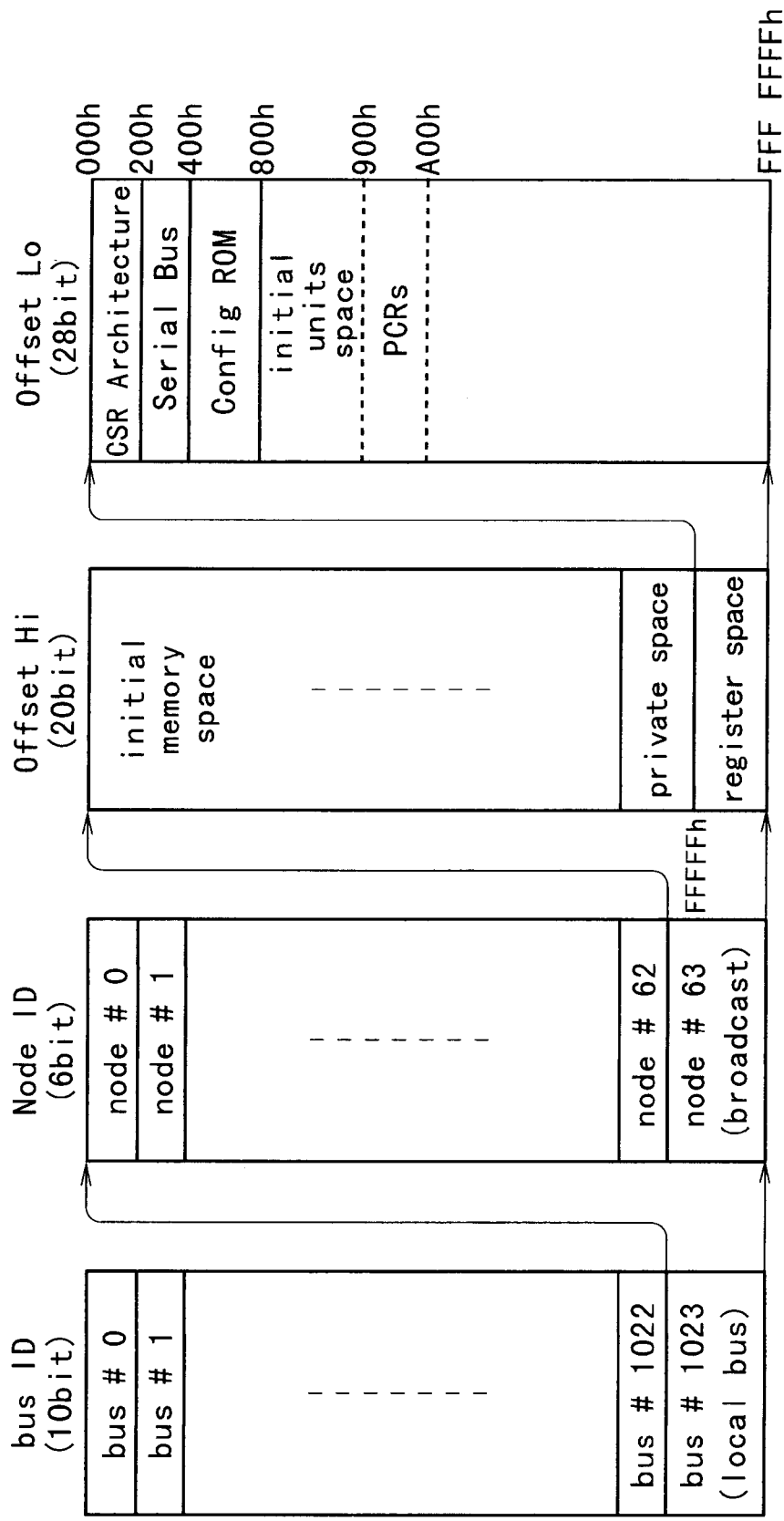
FIG. 2 is a schematic diagram showing the structure of an address space for a CSR architecture.

This IEEE 1394 communication is based on a control and status register (CSR) architecture which has a 64-bit address space defined by ISO/IEC13213. FIG. 2 is a schematic diagram illustrating the structure of an address space in the CSR architecture. The upper 16 bits of the address space are used for node identification (node ID) to uniquely identify a particular node on each IEEE 1394 bus while the remaining 48 bits are used to specify the address space assigned to each node. The upper 16-bit node ID is further subdivided into a 10-bit bus ID portion and a 6-bit physical ID portion (this portion represents node ID for a particular node on each bus). The node ID which has value 1 for all the bits is used for a special purpose, so 1,023 buses and 63 nodes for each bus can be specified in this system.

While the lower 48 bits of this 64-bit addressing scheme are to provide a 256-terabyte address space to each node, the space defined by the upper 20 bits of the lower 48 bits is subdivided into a register space, a private space and an initial memory space, said register space being used, for example, as a register characteristic to the 2,048-byte CSR and as a register characteristic to the IEEE 1394 communication. If the space defined by the upper 20 bits is a register space, then the lower 28 bits are used, for example, as a configuration ROM, an initial unit space, which is assigned for use characteristic to node specification, and a plug control register (PCRs). As a result, the above mentioned configuration ROM is arranged in a general ROM format in the range between addresses 400*h* and 800*h* in the register space.

Figure 3:
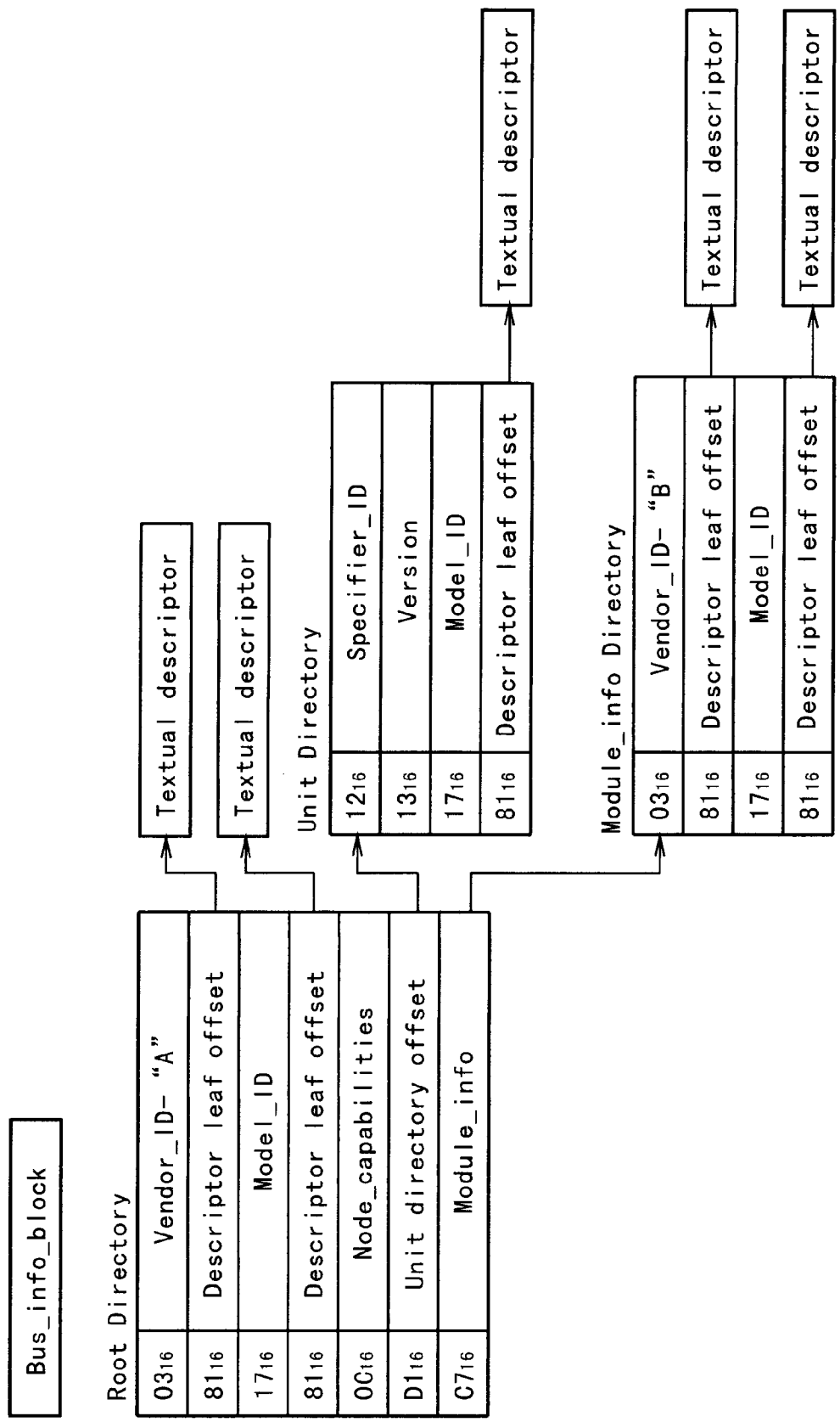
FIG. 3 is a schematic diagram showing the data structure of a configuration ROM.

FIG. 3 shows the data structure of the configuration ROM 140. This ROM 140 includes a bus information block, "Bus_info_block", a root directory, "Root Directory", a unit directory, "Unit Directory", and a module information directory, "Module_info Directory".

FIG. 4 shows the data structure of the bus information block, "Bus_info_block". The bus information block is composed of the first five quadlets of the ROM 140. Into the 64 bits comprising "node_vender_id", "chip_id_hi" and "chip_id_lo" in this bus information block, unique values (each value is specific, and it exists only for a unique corresponding item in the world) are entered for identification of a device. The "node_vender_id" is a unique ID assigned to a manufacturer (vender) by the IEEE/RAC, and the "chip_id_hi" and "chip_id_lo", which occupy a total of 40 bits, are IDs assigned uniquely by a respective manufacturer.

Now, each directory will be explained in detail. FIG. 5 shows a directory entry format. Each directory entry takes one quadlet (4 bytes or 32 bits of data), and the 1 byte to the most significant bit (MSB) is a "key" field, and the remaining 3 bytes are a "value" field. In addition, the 1 byte "key" field is further subdivided into a 2-bit "type" field and a 6-bit "key_ID" field. The "key" field of each directory is used as reference when a desired directory entry is to be searched.

As shown in detail in FIG. 6, the "type" field is used to specify the type of each directory entry. For example, if the "type" field is "0", then the "value" field of this directory entry is provided with an "immediate value". If the "type" field is "2", then the "value" field of the directory entry is provided with an offset of a particular leaf. If the "type" field is "3", then the "value" field of the directory entry is provided with the offset of this directory.

As shown in detail in FIGS. 7 and 8, the "key_ID" field describes the content of the "value" field. For example, "3" in the "key_ID" field indicates that the "value" field presents vender information, "7" indicates that the "value" field is of module information, and "17$_{16}$" indicates that the "value" field is of model information. In FIGS. 7 and 8, entry types of "immediate", "CSR offset", "directory offset" and "leaf offset" are represented by "I", "C", "D" and "L", respectively.

Returning to FIG. 3, the root directory has a "Vender_ID" entry, into which a Vender ID is provided to identify the Vender of the interface unit 130 (for example, "A" company). This "Vender_ID" is accompanied by a "Textual descriptor", whose storage location is pointed by a "Descriptor leaf offset." The "Textual descriptor" is provided, for example, with textual information in Minimal ASCII to identify the Vender.

Figure 9:
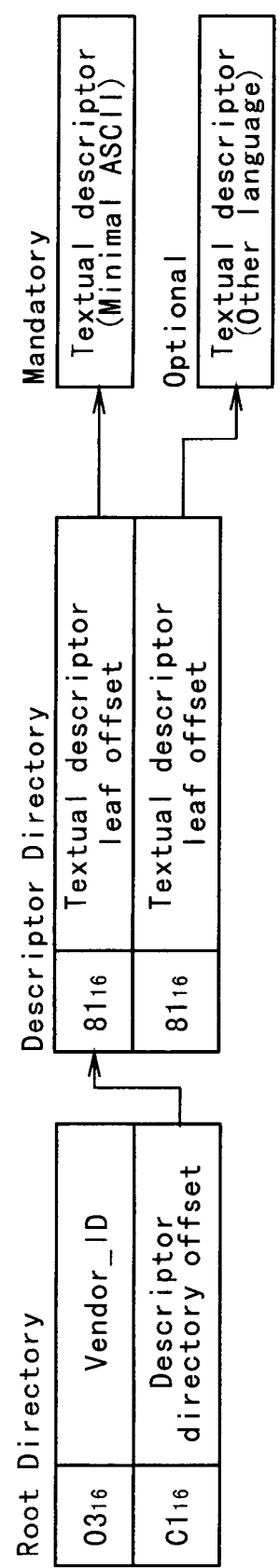
FIG. 9 is a schematic diagram showing another structure to be used for an entry of "Vender_ID"

As shown in FIG. 9, the root directory may be arranged to include "Descriptor Directory offset", which points to the storage location of a "Descriptor Directory", and in the "Textual Descriptor Directory", a "Textual Descriptor leaf offset" may be provided to point to the storage location of a mandatory "Textual descriptor" and another "Textual Descriptor leaf offset" may be provided to point to the storage location of an optional "Textual Descriptor". For example, the Mandatory "Textual descriptor" may be provided with textual information in Minimal ASCII to identify the Vender while the optional "Textual Descriptor" may be provided with textual information in another character code set also for the identification of the vender.

Figure 10:
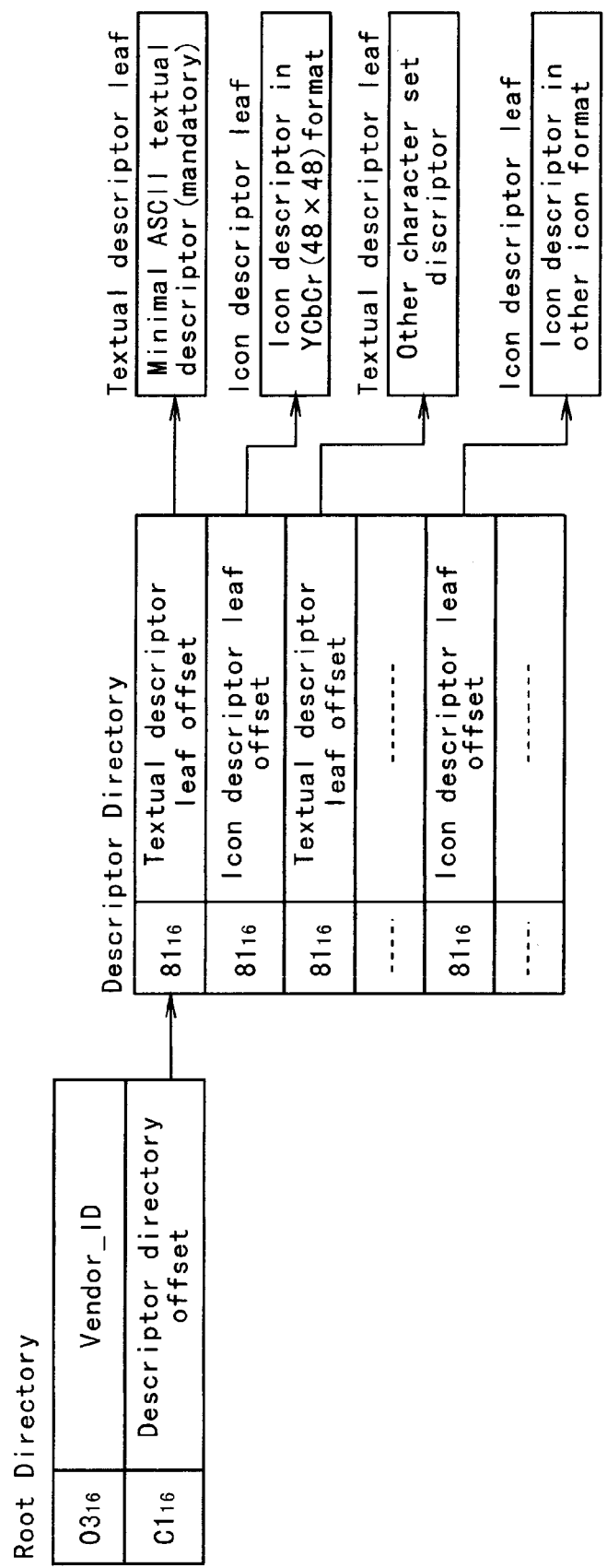
FIG. 10 is a schematic diagram showing yet another structure to be used for an entry of "Vender_ID"

As shown in FIG. 10, the root directory may also be arranged with a "Descriptor Directory offset" which points to the storage location of a "Descriptor Directory". In this "Descriptor Directory", an "ICON Descriptor leaf offset" may be provided to point to the storage location of an optional "ICON Descriptor". In this case, the "ICON Descriptor" is provided with data to show an icon describing the Vender. To provide ICON data in the "ICON Descriptor", it is essential to use a "YCbCr Format" in a size of 48×48 pixels.

In summary, the Descriptors are prepared in the following order: Textual Descriptor (in Minimal ASCII), ICON Descriptor (YCbCr Format), Textual Descriptor (in another coded character set, possibly in plurality), and ICON Descriptor (in another ICON Format, possibly in plurality).

Returning again to FIG. 3, the "Model_ID" of the root directory is provided with a model ID to identify the model of the interface unit 130. This "Model_ID" entry is accompanied by a "Textual descriptor", whose storage location is pointed by a "Descriptor leaf offset". This "Textual descriptor" may be provided, for example, with textual information in Minimal ASCII to show the model name of the interface unit.

Figure 11:
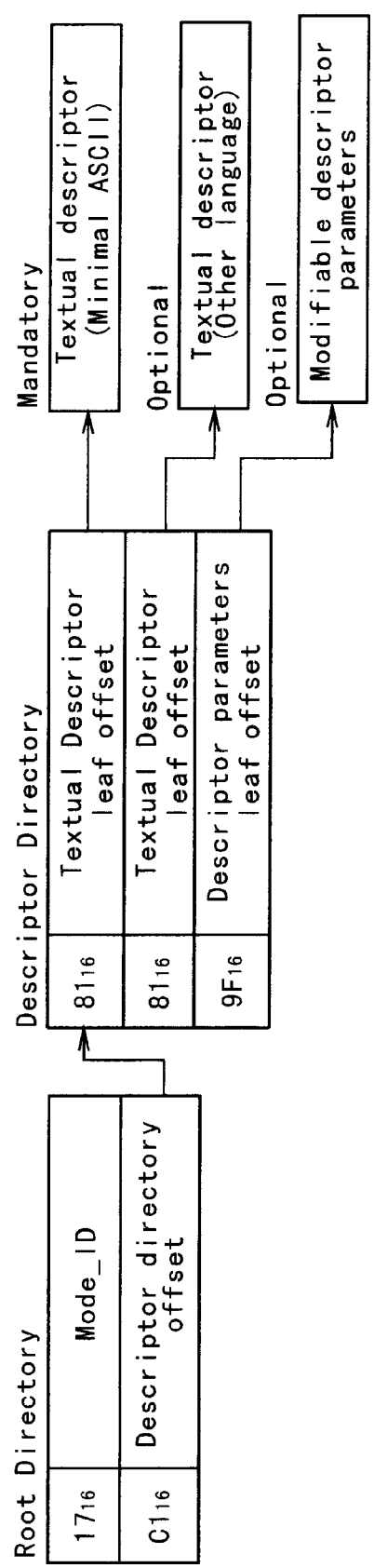
FIG. 11 is a schematic diagram showing another structure to be used for an entry of "Model_ID"

As shown in FIG. 11, the root directory may also be arranged with a "Descriptor Directory offset" to point the storage location of a "Descriptor Directory". In this "Descriptor Directory", in turn, a "Textual Descriptor leaf offset" is provided to point to the storage location of a mandatory "Textual descriptor", and another "Textual Descriptor leaf offset" and a "Descriptor parameters leaf offset" may be provided to point to the storage locations of an optional "Textual descriptor" and of a "Modifiable descriptor", respectively. For example, the mandatory "Textual descriptor" may be provided with the model name of the unit in Minimal ASCII. In addition, the optional "Textual descriptor" may be used to provide the model name in another coded character set while the "Modifiable descriptor" may be used to provide a model name in a character code which can be rewritten by a user.

Figure 12:
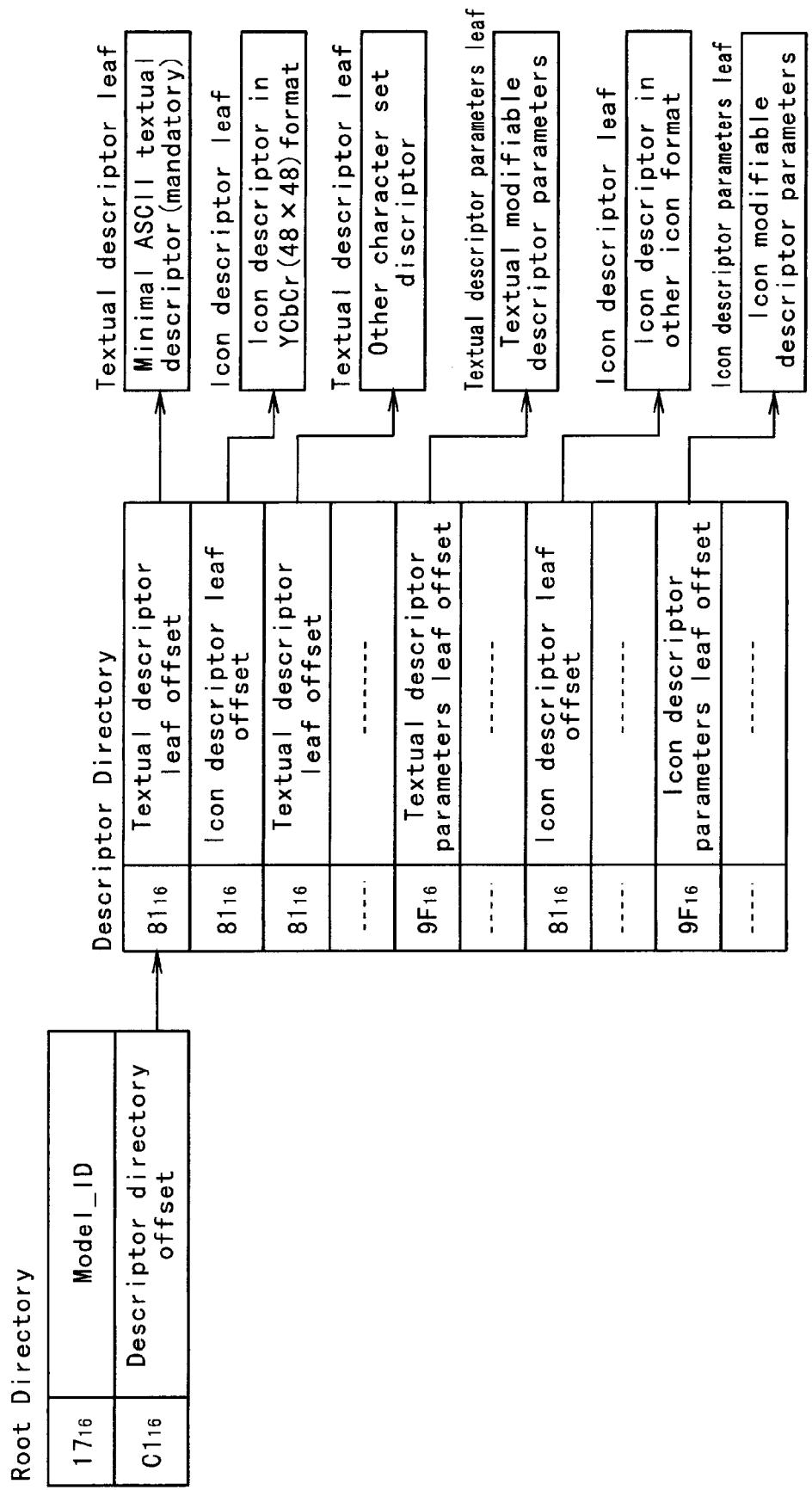
FIG. 12 is a schematic diagram showing yet another structure to be used for an entry of "Model_ID."

As shown in FIG. 12, the root directory may also be arranged with a "Descriptor Directory offset" to point to the storage location of a "Descriptor Directory". In this "Descriptor Directory", an "ICON descriptor leaf offset" and a "Descriptor parameters leaf offset" may be provided to point to the storage locations of an optional "ICON Descriptor" and a "Modifiable Descriptor", respectively. In this case, the optional "ICON Descriptor" may be provided with icon data indicating the model of the unit while the "Modifiable Descriptor" may be provided with icon data indicating the model, which data can be rewritten by the user.

To provide ICON data in the "ICON Descriptor", it is essential to use a "YCbCr Format" in a size of 48×48 pixels.

In summary, the Descriptors are prepared in the following order: Textual Descriptor (in Minimal ASCII), ICON Descriptor (YCbCr Format, 48×48), Textual Descriptor (in another coded character set, possibly in plurality), Modifiable Descriptor (in another coded character set, possibly in plurality), ICON Descriptor (in another ICON Format, possibly in plurality) and Modifiable Descriptor (in another ICON Format, possibly in plurality).

A node, which is an access unit on an IEEE 1394, may have a plurality of units that are functional independently though they share the same address space of the node. Therefore, the unit directory is arranged to show, for example, the version of the software used for the unit. While the storage locations of the bus information block and the root directory are fixed, the storage locations of the remaining blocks are not fixed and are pointed by offset addresses.

Returning to FIG. 3, the root directory has a "Unit directory offset" entry to point to the storage location of the unit directory. The unit directory has "Specifier_ID", "Version" and "Model_ID" entries. The "Model_ID" entry is provided with a model ID to identify the model of the unit. This "Model_ID" is accompanied by a "Textual descriptor" whose location is pointed by a "Descriptor leaf offset." This "Textual descriptor" may be provided, for example, with textual information in Minimal ASCII to show the model name.

The "Textual descriptor" accompanying the "Model_ID" entry of this unit directory and the "Textual descriptor" accompanying the "Model_ID" entry of the above mentioned root directory may exist in the identical storage location or in different storage locations.

In addition, the root directory has a "Module_info" entry to point to the storage location of a module information directory (Module_info Directory). The module information directory has "Vender_ID" and "Model_ID" entries.

The "Vendor_ID" entry is provided with a Vendor ID to identify the vendor (for example, "B" company) of the module (VCR 100). This "Vendor_ID" entry is accompanied by a "Textual descriptor" whose storage location is pointed by a "Descriptor leaf offset". The "Textual descriptor" is provided, for example, with textual information in Minimal ASCII to show the vendor name. The structure of this "Vendor_ID" entry may be arranged in the same way as the "Vendor_ID" entry of the root directory as shown in FIG. 9 or FIG. 10. In this case, the "Root Directory" shown in FIG. 9 and FIG. 10 corresponds with the "Module_info Directory".

The "Model_ID" entry is provided with a model ID to identify the model of the module. This "Model_ID" entry is accompanied by a "Textual descriptor" whose storage location is pointed by a "Descriptor leaf offset". The "Textual descriptor" is provided, for example, with textual information in Minimal ASCII to show the model name. The structure of this "Model_ID" entry may be arranged in the same way as the "Model_ID" entry of the root directory as shown in FIG. 11 or FIG. 12. In this case, the "Root Directory" shown in FIG. 11 and FIG. 12 corresponds with the "Module_info Directory".

In this preferred embodiment, when another electronic device, for example, IRD 10, accesses the configuration ROM 140 provided in the IEEE 1394 interface unit 130 of the VCR 100, the electronic device according to the present invention allows such another electronic device to easily acquire the above described model information, i.e., model ID and user interface information (textual and icon information describing the model).

For example, the other electronic device can easily acquire the information of a directory offset, which points to the storage location of the "Module_info Directory", from the "Module info" entry of the root directory, and acquire the model ID from the "Model_ID" entry of the "Module_info Directory". Furthermore, it can acquire the information of the "Descriptor leaf offset", which points to the storage location of the "Textual descriptor", from the "Module_info Directory", and acquire the textual information describing the model name from the "Textual descriptor" (refer to FIG. 3).

Moreover, it can also acquire the information of a leaf offset that points to the storage locations of the "Textual descriptor" and "ICON descriptor" from the "Module_info Directory", and acquire the textual and icon information identifying the model name from the "Textual descriptor" and the "ICON descriptor" (refer to FIGS. 11 and 12).

The above embodiment has been described for a VCR 100 which is connected to an IEEE 1394 bus 20 through an IEEE 1394 interface unit 130. However, the present invention is applicable in the same way to other electronic apparatus, for example, to a personal computer (PC) that is connected to an IEEE 1394 bus through a PC card, which functions as IEEE 1394 interface unit.

In the above embodiment, there are two storage areas to store model information in the configuration ROM 140 of the IEEE 1394 interface unit 130. However, the number of storage areas may be increased to three or more.

While the forgoing specification has described the preferred embodiment(s) of the present ivention, one skilled in the art may make many modifcations to the preferred embodiment without departing from the invention in its broader aspects. The appended claims, therefore, are intended to cover all such modifications as fall within the true and spirit of the invention.

What is claimed is:

1. A communication interface for use within an electronic module having a predetermined function, said communication interface facilitating communication between said electronic module and at least one external electronic device coupled to said electronic module via a serial data bus, said communication interface comprising:

a configuration ROM adapted to be directly accessible from said external electronic device, said configuration ROM including a plurality of storage areas to store model information of both said communication interface and said electronic module;

whereby said model information of both said communication interface and said electronic module is obtainable by said external electronic device directly accessing said configuration ROM of said communication interface via said serial data bus.

2. The electronic device communication interface as set forth in claim 1, wherein the communication interface is an IEEE 1394-compatible-interface.

3. The electronic device as set forth in claim 1, wherein said model information is a model identifier for identifying a model of an electronic device.

4. The electronic device as set forth in claim 1, wherein said model information is user interface information about a model of an electronic device.

5. The electronic device as set forth in claim 4, wherein said user interface information is textual data for describing the name of said model.

6. The electronic device as set forth in claim 5, wherein said textual data is stored in Minmal ASCII.

7. The electronic device as set forth in claim 4, wherein said user interface information is icon data information for describing said model.

8. The communication interface as set forth in claim 1, wherein said electronic module is an audio/video recording/reproducing device.

9. The communication interface as set forth in claim 1, wherein said electronic module is a personal computer.

10. A model information acquisition method for acquiring, by an external device, model information of an electronic module having a predetermined function, said electronic module having a communication interface housed therein to facilitate communication between said module and external devices coupled thereto via a serial data bus, said method comprising:

directly accessing, by said external device via said serial data bus, a configuration ROM of said communication interface within said module, wherein said configuration ROM contains model information of both said communication interface and said electronic module;

whereby said external device obtains from said configuration ROM said model information of both said communication interface and said electronic module.

11. The model information acquisition method as set forth in claim 10, further comprising the steps of:

acquiring, by said external device, storage location information pointing to a storage location of a module information directory of said configuration ROM from a root directory of said configuration ROM, and acquiring, by said external device, a model identifier for identifying the module's model as said model information from the module information directory of said configuration ROM on a basis of said storage location information.

12. The model information acquisition method as set forth in claim 10, further comprising the steps of:

acquiring, by said external device, first storage location information pointing to a storage location of a module information directory of said configuration ROM from a root directory of said configuration ROM, acquiring, by said external device, second storage location information pointing to a storage location of user interface information as said model information in said configuration ROM from the module information directory of said configuration ROM on a basis of said first storage location information, and acquiring, by said external device, said user interface information from said configuration ROM on a basis of said second storage location information.

13. The method of claim 10, wherein said communication interface is an IEEE 1394-compatible-interface.

14. The method of claim 10, wherein said communication interface is an IEEE 1394-compatible-interface.

15. The method as set forth in claim 10, wherein said electronic module is an audio/video recording/reproducing device.

16. The method as set forth in claim 10, wherein said electronic module is a personal computer.

17. An electronic module comprising:

electronic circuitry to perform a predetermined electronic function; and a communication interface disposed within said electronic module and operable to facilitate communication between said electronic module and at least one external electronic device coupled to said electronic module via a serial data bus, said communication interface comprising:

a configuration ROM adapted to be directly accessible from said external electronic device, said configuration ROM including a plurality of storage areas to store model information of both said communication interface and said electronic module;

whereby said model information of both said communication interface and said electronic module is obtainable by said external electronic device directly accessing said configuration ROM of said communication interface via said serial data bus.

18. The electronic module as set forth in claim 17, wherein said electronic module is an audio/video recording/reproducing device.

19. The electronic module as set forth in claim 17, wherein said electronic module is a personal computer.

* * * * *